(12) United States Patent
Ramsden et al.

(10) Patent No.: US 7,363,548 B2
(45) Date of Patent: Apr. 22, 2008

(54) PROBABLE CAUSE FIELDS IN TELECOMMUNICATIONS NETWORK ALARM INDICATION MESSAGES

(75) Inventors: Chris Ramsden, Hertford (GB); Walter Collins, Hillsborough (GB); Martin Soukup, Ottawa (CA); Sharon Chisholm, Ottawa (CA); James Alves, Rockwall, TX (US); April Pennisi, Raleigh, NC (US); Charles Gale, Clayton (CA); Doug Trump, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 604 days.

(21) Appl. No.: 10/952,028

(22) Filed: Sep. 28, 2004

(65) Prior Publication Data
US 2005/0105696 A1    May 19, 2005

(30) Foreign Application Priority Data
Sep. 29, 2003    (GB) ................................ 0322741.0

(51) Int. Cl.
*G06F 11/00*    (2006.01)

(52) U.S. Cl. .............................. 714/48; 714/4; 714/39; 714/44; 714/47; 714/49; 714/57

(58) Field of Classification Search ................. 714/4, 714/39, 44, 47, 48, 49, 57
See application file for complete search history.

(56) References Cited

U.S. PATENT DOCUMENTS

| 6,260,062 B1 * | 7/2001 | Davis et al. ................. 709/223 |
| 6,263,366 B1 * | 7/2001 | Jacobs et al. ................ 709/223 |
| 6,707,795 B1 * | 3/2004 | Noorhosseini et al. ...... 370/242 |
| 2002/0004828 A1 * | 1/2002 | Davis et al. ................. 709/223 |

* cited by examiner

*Primary Examiner*—Robert Beausoliel
*Assistant Examiner*—Charles Ehne
(74) *Attorney, Agent, or Firm*—Barnes & Thornburg LLP

(57) ABSTRACT

Data for inclusion in a probable cause field of a telecommunications network alarm indication message is structured to comprise first and second delimited data elements respectively indicating first and second predetermined (ie standardized) probable cause codes, the first and second predetermined probable cause codes relating to one or more characteristics of an event occurring or having occurred in a telecommunications network. Methods, apparatus and computer programs for generating and for processing such data is provided as well as signals representing such data.

21 Claims, No Drawings

US 7,363,548 B2

PROBABLE CAUSE FIELDS IN TELECOMMUNICATIONS NETWORK ALARM INDICATION MESSAGES

CROSS-REFERENCE TO RELATED APPLICATION

This application claims the benefit of priority of Great Britain patent application Ser. No. 0322741.0 of C. Ramsden et al. entitled "Structured Probable Causes for Management Systems and Network Devices and their Exploitation" filed on Sep. 29, 2003.

FIELD OF THE INVENTION

The present invention relates to methods of, apparatus for and computer programs for generating and processing data included in a probable cause field of a telecommunications network alarm indication message and to signals representing probable cause fields of telecommunications network alarm indication messages.

BACKGROUND TO THE INVENTION

Network management systems use information indicating a probable cause of a network event in performance monitoring and in operation and maintenance of telecommunications networks. When a device in a network detects an event (such as a network element failure) it notifies the network management system by sending an alarm indication message. Information identifying the event is included in the alarm indication message in a field known as the "probable cause" field. The probable cause field is important because it enables a network operator to begin the process of diagnosis in order to fix any underlying problem. The alarm indication message also contains other useful fields such as the object instance (which describes the precise entity where the condition was detected); a timestamp, a severity indication, and so on.

Use of a standardised list of probable cause codes is known. For example, a list of probable cause codes is defined by the ITU-T in CCITT Recommendations M.3100 (1995) Generic Network Information Model; M.3100 Amendment 2 (1999): 1999; X.721 (1992) ISO/IEC 10165-2: Structure of management information: Definition of management information; and X.733 (1992) ISO/IEC 10164-4: Systems Management: Alarm reporting function. Other standards bodies, such as IETF, GSM and 3GPP have also defined standard probable cause codes.

The list of probable cause codes defined in the above standards specifications are either numeric (for example, M.3100 code '12' which indicates excessive bit error rate) or textual (for example 'ExcessiveBER'). Such codes offer a very concise representation of a probable cause and were conceived at a time when bandwidth and processing power were limited to avoid using a significant proportion of the available bandwidth and processing capacity for performance monitoring and operations and maintenance. Note that a single network event will typically result in a large number of alarms being raised by various devices which are affected by the event around the network. This is known as alarm flooding. Because of alarm flooding, a single event can trigger a large volume of alarm signalling to network management systems taking up a corresponding large proportion of bandwidth and processing capacity.

It is highly valuable to have a standardised set of probable cause codes for interoperability of equipment and software from multiple vendors. With the gradual convergence of different network technologies, for example wireline, wireless and optical networks, this becomes even more important.

However, technological advancement in telecommunications systems, equipment, protocols and software gives rise to an ever increasing and changing set of possible network events that may occur. It is desirable to be able to report these events in a meaningful way to network management systems for performance monitoring and operations and maintenance. Unfortunately, this objective is incompatible with the need to maintain a standardised set of probable cause codes because the procedures of standards bodies are simply unable to keep up with the rapid rate of technological advancement. Thus, in the past, relatively infrequent amendments to standards specifications have been made which typically include dramatic extensions to the list of probable cause codes.

One problem with the above is that, prior to the inclusion of new probable cause codes, vendors have tended to map new network events that may occur to existing probable cause codes in an imprecise or inaccurate manner. For example, the network event of the synchronisation status of a node being unstable might be mapped to "timingProblem" or "synchronizationSourceMismatch". "SynchronisationSourceMismatch" is not an accurate mapping, whereas "timingProblem" is very vague. Either way, this results in a loss of valuable information that might otherwise be reported to network management systems.

This loss of information also results in problems when it comes to clearing previously set alarms because the imprecise or inaccurate mapping results in a many-to-one, one-to-many or even a many-to-many mapping between network events that trigger the raising and setting of an alarm and network events that trigger the clearing of an alarm.

Another problem is that legacy network management applications or equipment that were developed before a new probable cause code is introduced is unable to understand and process an alarm indication message having that probable cause code and thus evolution or replacement of transport network equipment or software often requires a radical overhaul of network management systems as well.

SUMMARY OF THE INVENTION

In short, the present invention consists of:
a notation for the probable cause field in messages that network devices send to management systems.
a method for devices to generate messages with this notation
an application that interprets these messages.

According to one aspect of the present invention, there is provided a method of generating data for inclusion in a probable cause field of a telecommunications network alarm indication message, the method comprising:
detecting the occurrence of an event in a telecommunications network;
mapping one or more characteristics of the event to first and second predetermined probable cause codes; and
generating the data for inclusion in a probable cause field of a telecommunications network alarm indication message, the generated data comprising first and second delimited data elements respectively indicating the first and second predetermined probable cause codes.

In one embodiment, the first predetermined probable cause code identifies a condition effecting an entity of the network.

In one embodiment, the second predetermined probable cause code identifies an attribute of an entity of the network.

In one embodiment, the method comprising mapping the one or more characteristics of the event to a third predetermined probable cause code identifying a qualifier of the attribute, and wherein the generated comprises a third delimited data element indicating the third predetermined probable cause code.

According to another aspect of the present invention, there is provided a method of generating a telecommunications network alarm indication message, the method comprising generating data for inclusion in a probable cause field of a telecommunications network alarm indication message according to the above method; and including the generated data in a telecommunications network alarm indication message.

According to another aspect of the present invention, there is provided a method of processing a telecommunications network alarm indication message, the method comprising:

identifying first and second delimited data elements in a probable cause field of s the alarm indication message;

recognising a first predetermined probable cause code from a first one of the first or second data elements; and processing the alarm indication message using the first predetermined probable cause code.

In one embodiment, the first predetermined probable cause code identifies a condition effecting an entity of a telecommunications network.

In one embodiment, the first predetermined probable cause code identifies an attribute of an entity of a telecommunications network.

In one embodiment, the above method comprises recognising a second predetermined probable cause code from a second one of the first or second data elements, wherein the second predetermined probable cause code identifies a qualifier of the attribute and wherein the step of processing the alarm indication message uses the second predetermined probable cause code.

In one embodiment, the step of processing the alarm indication message comprises displaying the first predetermined probable cause code, or information derived therefrom, on a user display.

In one embodiment, the step of processing the alarm indication message comprises selecting the alarm indication message in dependence on whether the first predetermined probable cause code matches a predetermined criterion.

Apparatus and computer programs corresponding to the above methods are also provided.

According to another aspect of the present invention, there is provided a signal representing a probable cause field of a telecommunications network alarm indication message, the probable cause field comprising first and second delimited data elements respectively indicating first and second predetermined probable cause codes, the first and second predetermined probable cause codes relating to one or more characteristics of an event occurring or having occurred in a telecommunications network.

In one embodiment, the first predetermined probable cause code identifies a condition effecting an entity of the network.

In one embodiment, the second predetermined probable cause code identifies an attribute of an entity of the network.

In one embodiment, the probable cause field comprises a third delimited data element indicating a third predetermined probable cause, the third predetermined probable cause code relating to the one or more characteristics of an event occurring or having occurred in a telecommunications network, the third predetermined probable cause code identifying a qualifier of the attribute.

According to another aspect of the present invention, there is provided a signal representing a telecommunications network alarm indication message, the message comprising a probable cause field, the probable cause field comprising first and second delimited data elements respectively indicating first and second predetermined probable cause codes, the first and second predetermined probable cause codes relating to one or more characteristics of an event occurring or having occurred in a telecommunications network.

The preferred features may be combined as appropriate, as would be apparent to a skilled person, and may be combined with any of the aspects of the invention.

One advantage of the present invention is that it simplifies extension of standards defining probable cause information. By using first and second delimited data elements respectively indicating first and second predetermined probable cause codes, new probable causes may be identified by either i) adding new first probable cause codes, while using existing standardised second probable cause codes; ii) adding new second probable cause codes, while using existing standardised first probable cause codes; or iii) adding both new first probable cause codes and new second probable cause codes. For example, instead of standardising x*y new probable cause codes, where x new conditions are identified for y new attributes of network entities, only x+y new probable cause codes need be standardised. Thus, the combinatory explosion of new possible conditions that may effect new network entities is avoided. Furthermore, it is likely that either i) standardised probable cause codes already exist for the conditions that may effect new attributes of network entities (in which case only y new probable cause codes representing teh new attributes need be standardised) or ii) standardised probable cause codes already exist for either the attributes of network entities that may be effected by new conditions (in which case only x new probable cause codes representing the new conditions need be standardised).

Another advantage is that it improves the accuracy and precision with which the probable causes of network events may be communicated to network management systems. New network events may be mapped to a richer set of standardised probable cause information—ie the set of all valid combinations of first and second probable cause codes. Furthermore, when probable cause information is generated to signify a new network event using standardised probable cause codes, the degree of precision with which each of the first and second data elements indicating first and second probable cause codes may be varied independently of each other. Thus, for example, the attribute of a network entity effected may be indicated with high precision (such as "IAPDlinkProtocol") whereas the condition may be left vague (such as "fault") or vice versa. Thus, loss of information or inaccuracy is avoided, since precision may be applied where it is appropriate and not where it is not appropriate.

Additionally, new network management applications or equipment which can recognise probable cause information comprising first and second delimited data elements respectively indicating first and second predetermined probable cause codes can perform advanced processing of alarm indication messages. For example, a network management application that filters (ie selects) alarm indication messages on the basis of prior art probable cause can only simply filter based on the entire probable cause. Hence an attempt to filter alarm indication messages on "all failed items" would require either explicitly identifying all probable causes that involve failure or for the application to have these built in. The latter would require the application designer to attempt to anticipate all such possible filters and hard code the detailed prior art probable cause codes that these would implicitly reference. Any added new probable cause codes would not be included in the list, hence the application would need rebuilding to give an accurate response every time a new probable cause code was added to the list. In contrast, the present invention allows the use simple filters (eg on any fail) without the application developer having to anticipate such filters. This is achieved because the notation described above separates the condition (eg fail) from the attribute (eg circuit pack).

Furthermore, legacy network management applications or equipment developed before a new probable cause code is introduced may be able partially to recognise and process probable cause information comprising first and second delimited data elements respectively indicating first and second predetermined probable cause codes. For example, a legacy application will be able partially to process probable cause information when a network entity exploits a new and unrecognised attribute against an existing and recognised condition or vice versa.

It will be apparent that the above advantages are even more applicable with probable cause information comprising three or more delimited data elements respectively indicating three or more predetermined probable cause codes.

There now follows, by way of example only, a detailed description of preferred embodiments of the present invention.

DETAILED DESCRIPTION OF INVENTION

Proposed Notation

Structure

The structure of the probableCauseText is as follows:

```
<probableCauseText>=<condition>.<qualified attribute that condition
effects>.[<additional information>]
where:
        <condition> = {fail|mismatch|suspect|etc} (This list is defined below)
        <qualified attribute that condition effects>=
    <affected attribute>|<affected attribute>(<qualifier>[.<qualifier>]*)
and
        <affected attribute> is a string representing the attribute (e.g. circuitPack)
        <qualifier> is either a string or of the form <name>=<value>, where
<name> and <value> are strings
        <additional info>=<additional info item> | (<additional info
item>[.<additional info item>]*)
and
    <additional info item> is either a string or of the form <name>=<value>,
where <name> and <value> are strings.
```

Examples of Structured Probable Causes

| Structured Probable Cause | Basic Probable Cause | M.3100 Integer Value |
|---|---|---|
| fail.replaceableUnit | replaceableUnitProblem | 69 |
| mismatch.trailTrace | pathTraceMismatch | 13 |
| thresholdFatal.errorRate(basis=bit) | excessiveBER | 12 |
| thresholdCrossed.qos(parameter=SES.direction=RX.location=FE.timePeriod=24H) | a specific case of thresholdCrossed | 549 |

Conditions

This section contains the current list of valid condition values and their definitions.

The list of conditions includes neutral conditions (e.g. inProgress) as well as negative conditions (e.g. fail). Conclusions cannot therefore be drawn on the basis of the condition alone. The condition needs to be considered in the context provided by the accompanying attribute.

Conditions are not meant to be extended except through updates to standards

| Category | Condition | Clarification of meaning |
|---|---|---|
| Discrete "errors" | | |
| | fault | A perceived malfunction in a network element. |
| | fail | Attribute is experiencing a fatal fault. |
| | corrupt | A corruption of software or data stores. Used only for data stores or software (thresholdCrossed is used for signal corruption). |

-continued

| Category | Condition | Clarification of meaning |
|---|---|---|
| Range "errors" | outOfSequence | Attribute received in unexpected sequence. |
| | suspect | Attribute's state or behaviour is suspect. |
| Comparators | thresholdCrossed | Attribute has left a normal range. Non-fatal. |
| | thresholdFatal | Attribute has left a normal range. Fatal. |
| | missing | Attribute is expected but is missing. |
| | unexpected | Attribute is not expected but is present. |
| | unknown | Attribute is present but is unknown. |
| | mismatch | Attribute is present but does not match attribute which is expected. |
| | duplicate | Attribute is present but is a duplicate (or its value is a duplicate) of another attribute and duplication is forbidden. |
| Configuration | enabled | Attribute is "enabled" contrary to its normal configuration. "Active" and "enabled" are distinct in that "enabled" refers to something that is configured whereas "active" refers to the state that something has moved to. |
| | disabled | Attribute is "disabled" contrary to its normal configuration. |
| Sync/Timing specific conditions | freerun | The timing generator is running off its internal clock at its own natural frequency. |
| | holdover | The timing generator is running off its internal clock at the rate of its last external reference source. |
| | lossOfReference | The timing generator has lost its external reference source. |
| Status | test | Attribute is under test. Where a test is in progress "test" takes precedence over "inProgress". |
| | shutdown | Attribute is shut down. |
| | unavailable | Attribute is unavailable (but not "missing" and not "disabled"). |
| | open | Attribute (physical attribute) is open e.g. open.enclosureDoor. |
| | tripped | Attribute (circuit breaker) is tripped. |
| | inProgress | Attribute (which is a process) is in progress. Note in the case of a test in progress "test" should be used rather than "inProgress". |
| | interrupt | Attribute (which is a process) is interrupted. |
| | blocked | Attribute is blocked from normal function. |
| | active | Attribute is configured "active" contrary to its normal state. Note the distinction between "inProgress" and "active" - "inProgress" refers to a process, "active" refers to a configuration. In the case of a protection switch "protectionActive" takes precedence over "active". "Active" should not be used to report an active test - "test" should be used instead. |
| Protection | protectionActive | A protection switch is active but no loss of protection is implied. An example is a manual protection switch, where protection is still present should the manually selected source fail. |
| | lossOfRedundancy | A protection switch is active and a loss of protection is implied. An example is an automatic protection switch due to a defect on one path and the switch takes place to the alternative path. |
| Other | hazard | Attribute is a hazard in the network element's environment. |
| | reduced | Attribute is operating at reduced capacity. |
| | congestion | Attribute is congested. |
| | change | An attribute or condition has changed. |

Attributes

This section contains the current list of attribute values. This list is expected to be extended.

a_BIS_to_BTS_interface
    abnormallyTerminated
    acquiring
    adapter
    address
    airCompressor
    airConditioning
    airDryer
    Alarm
    alarmIndicationSignal
    alarmIndicationSignal(direction=tx)
    alarmReportingReduced
    Alias
    alignment
    alternateModulationSignal
    antenna applicationSubsystem
attribute
Audit
authentication
automaticLaserShutdown
backplane
Backup
backupRestoration
bandwidth
bandwidthReduced
baseRegisterUsedTwice
Battery
batteryBreakdown
batteryCharging
batteryDischarging
Billing
billingSoftware
bitError(location=FE)
breachOfConfidentiality
breaker
broadcastChannel
bufferLevelCrit
cableTamper
cacheBackup
callSetUp
callTreatment
cancelRestore
checksum
Circuit
Clock
clockAccuracy
clockSynchronisation
combiner
commercialPower
Comms
communicationProtocol
communicationSubsystem
configurationOrCustomisation
configurationOrSoftwareVersion
congestion
connection
connectionEstablishment
console
controlSignal
controlSignalPort
coolingSystem
Cpu
cPUCyclesExceeded
dataCommsChannel
dataCommsChannelPort
dataCommunicationsChannel
dataEntry
dataFill
dataSetorModem
definitions
delayedInformation
denialOfService
destination
destinationUnavailable
deviceLoader
diagnosticTest
dialPulse
digitone
Disk
disk75full
disk90full
distribution download
downstreamBufferOverflow
dTEDCEInterface
editionCode
enclosureDoor
Engine
Entry
environment
errorRate
errorRate(basis=bit)
eventReportingReduced
explosiveGas
external
externalDevice
externalEquipment
externalIfDevice
externalPowerSupply
externalTransmissionDevice
fan
feature
file
fileEncryption
fileSystemCall
fileTransfer
fire
fireDetector
flood
fragmentation
frame
frequencyHopping
frequencyRedefinition
fuse
gas
generation
generator
handshake
hardwarePort
headSegmentData
heatingOrVentilationOrCoolingSystem
highHumidity
highTemperature
highTrapRate
highWind
iceBuildUp
identifier
idleQ
incomingMessage
inconsistency
index
indexes
information
informationModicationDetected
initSize
inputDevice
inputOutputDevice
intercard
intercardControlLink
intercardDatalink
intercardLink
interfaceCard
interRingConnection
intrusion
invalidMessageReceived
invalidMSUreceived
inventory
ipHeader
ipIEntry jam
jitter
journalling
keyExpired
IAN
IanConnection
lAPDlinkProtocol
laser
laserBiasCurrentHigh
laserPerformance
latch
latency
LDCC
LDCCPort
leak
line
lineBabbleState
lineCard
link
linkCapacity
localAlarm
localTcpFailure
lock
lock(config=generation)
loggingCapacityReduced
loop
loopback
loopback(facility)
loopback(terminal)
lossOfAlignment
lossOfCellDelineation
lowBattery
lowCablePressure
lowFuel
lowHumidity
lowTemperature
lowVoltage
lowWater
mains(backup=battery)
mains(backup=none)
materialSupplyExhausted
memAllocation
memConfiguration
memory
message
messageNotInitialised
messageTransfer
module
moduleName
multiframe
multiFrequency
multilinkReset
multiplexer
nEIdentifier
networkServerIntervention
nonRepudiation
noResponse
operation
opticalPower
opticalTxPower
outgoingDefectIndication
outOfCPUCycles
outOfHoursActivity
outOfMemory
outputDevice
outsideVideoQuality
parameter
parameterOutOfRange
payloadType
performance
peripheral
phaseLockLoop
pointer
power
pressure
primarySyncReference
privateData
procedural
process
processor
processorOptionError
protection(byte)
protection(channelId)
protection(config=line)
protection(config=path)
protection(config=ring)
protection(config=span)
protection(opertype=auto)
protection(opertype=auto.config=line)
protection(opertype=auto.config=path)
protection(opertype=auto.config=ring)
protection(opertype=auto.config=span)
protection(opertype=force)
protection(opertype=force.config=distribution)
protection(opertype=force.config=generation)
protection(opertype=force.config=interRing)
protection(opertype=force.config=ring)
protection(opertype=force.config=span)
protection(opertype=lockout)
protection(opertype=lockout.config=distribution)
protection(opertype=lockout.config=generation)
protection(opertype=lockout.config=ring)
protection(opertype=lockout.config=span)
protection(opertype=manual)
protection(opertype=manual.config=ring)
protection(opertype=manual.config=span)
protection(opertype=operator.config=line)
protection(opertype=operator.config=path)
protection(protocol)
protectionExerciserComplete
protectionExerciserFail
protectionMechanism
protectionMode
protectionScheme
protectionSwitch(config=generation)
protectionSwitchFail
provisioning
pump
purgeOnSaturation
qos(parameter=CV.direction=rx.location=NE.period=15M)
qos(parameter=CV.direction=rx.location=NE.period=24H)
qos(parameter=direction=rx.location=NE.period=15M)
qos(parameter=direction=rx.location=NE.period=24H)
qos(parameter=ES.direction=rx.location=NE.period=15M)
qos(parameter=ES.direction=rx.location=NE.period=24M)
qos(parameter=opticalPower.direction=rx)
qos(parameter=SEFS.direction=rx.location=NE.period=24M)
qos(parameter=SES.direction=rx.location=NE.period=15M)

qos(parameter=SES.direction=rx.location=NE.period=
   24H)
qos(parameter=summary.direction=rx.location=
   NE.threshold=T1)
qos(parameter=summary.direction=rx.location=
   NE.threshold=T2)
qos(parameter=summary.threshold=T1)
qos(parameter=summary.threshold=T2)
qos(parameter=UAS.direction=rx.location=NE.period=
   24H)
queueSize
rAI
rAI(location=FE)
ram
rdi
rDI(location=FE)
receive
receiver
receiverMulticoupler
receiverTemperature
recovery
rectifier
rectifierHighVoltage
rectifierLowVoltage
reference
remoteConnAbort
replaceableUnit
replaceableUnitType
responseTime
restore
restoreCommit
reTransmission
retransmitTimeout
returnCode
route
routing
save
screening
SDCC
SDCCPort
secondarySyncReference
segmentationReassembly
sequence
sharedMemory
shelf
shutDown
signal
signalLabel
signalLabelUnequipped
signalQualityEvaluation
slot
smoke
sS7Protocol
sSM(config=distribution)
sSM(config=generation)
sstEntry
startUp
stateTransition
storage
storeType
streamCreation
summary
switchFail
synch
syncHardware
synchronisation
synchronization
synchronizationSource
systemCall
systemResourcesOverload
tableCounter
tableIncrement
tape
tcpPort
tcpSegmentError
temperature
terminal
thresholdChangeFailure
timeOfDay
timeoutExpired
timeslotHardware
timeToLiveExpired
todValue
toxicGas
toxicLeak
trailTrace
transaction
transceiver
transcoder
transcoderOrRateAdapter
translateFailure
transmission
transmission(location=FE)
transmission(location=NE)
transmit
transmitter
transmitterAntenna
transmitterAntennaNotAdjusted
transmitterLowVoltageOrCurrent
transmitterLowVoltageOrCurrrent
transmitterOffFrequency
transmitterOutputPower
transmitterOutputPowerReduced
transmitterTemperature
trunkCard
unassignedRegisterInUse
unauthorizedAccessAttempt
unavailableTime
unequipped
unprovisionedNetworkElements
unspecifiedReason
upgrade
upgradeDowngrade
usage
usageCounterOverflowed
usageRequest
variableOutOfRange
ventilationSystem
version
vibration
watchdogTimerExpired Detailed Syntax for Attributes Threshold (PM) related attributes are identified as having the following detailed structure:
   QoS([parameter=.]
      <direction=>.<location=>.<period=>)/
   (summary.<threshold=>)

Protection related attributes are identified as having the following detailed structure:
   Protection[.(item)]/Protection([<distribution/genera-
      tion>]<.opertype=>[.config=])

The reserved words used above and the values they may take are as shown:

| Reserved word | Values |
| --- | --- |
| parameter | SES\|ES\|UAS\|SEFS\|CV |
| direction | tx\|rx |
| location | NE\|FE (NE = near end, FE = far end) |
| loopback | facility\|terminal |
| opertype | force\|lockout\|manual\|auto |
| config | ring\|span\|line\|path\|interRing |
| period | 15 M\|24 H |
| threshold | T1\|T2 |

Structured Probable Cause Encoding

Currently the definitions in X.721 and M.3100 are in terms of definitions of enumerated type (integer) values in ASN.1. This proposal suggests using a structured text on interoperability interfaces. This text will be an engineering mnemonic text similar to the enumerated type names (which are already based on English). It is structured so that it is machine readable and can be used on a machine to machine interface. There are a number of reasons for replacing numbers with structured text as follows:

The management of number assignment is avoided (currently different standards have used the same number for different probable causes).

The text is human interpretable, leading to more clarity of meaning.

The text itself is structured in a flexible way meaning that the ASN.1 definition does not change as texts are added or structured. Note how the ASN.1 does not change as interpreters are designed to exploit the structure within the text string that is the probable cause.

The text can also be displayed, for human readability, where this is of value to the operator. When displayed, it can be displayed in other languages. This proposal defines the display texts for English (which are the same as the engineering mnemonics used on the interface). It does not define display texts for other languages but allows for them. The ASN.1 in X.721 and M.3100 will add an ASN.1 cstring attribute, probableCauseText, wherever probableCause exists.

Backwards Compatibility

The probableCauseText field will be used by existing systems in the following manner while migration to this new field occurs:

1. Existing applications use the integer value probableCause.
2. This proposal adds probableCauseText as a structured string value.
3. New applications that understand these values should read the probableCauseText. If this is null or not present they should read the probableCause (as a number) and process according to the existing meanings.
4. New applications that set these values should set the probableCauseText attribute according to this proposal, and set the probableCause field according to the best value available in the existing list.

Mechanism for Devices to Generate the Probable Cause

A device will store the above texts in their internal memory. When a particular alarm condition is detected, it will construct the text according to the rules and transmit the probable cause to a management application.

There is nothing new about the mechanism proposed here.

Management Application to Receive and Interpret the Probable Cause

Many management applications currently maintain a list of alarms. They can display the list of alarms that can be raised and many applications allow this list to be filtered on the basis of date time, probable cause and equipment.

An application that filters on the basis of probable cause can only simply filter based on the entire probable cause. Hence an attempt to filter on "all failed items" would require either the customer to explicitly identify all probable causes that involve failure or for the application to have these built in. The latter would require the application designer to attempt to anticipate all such possible filters and hard code the detailed probable cause numbers that these would implicitly reference. In addition the addition of a new cause would not be included in the list, hence the application would need rebuilding to give an accurate response every time a new item was added to the list.

This invention allows the customer to use simple filters (eg on any fail) without the application developer having to anticipate such filters. This is achieved because the notation described above separates the condition (eg fail) from the attribute (eg circuit pack). An application developer merely develops a parser that takes into account the structure defined in section 2 and parses this structure to separate out the condition, then compares this condition with the condition that the customer entered. The application can then list all alarms that have a condition of fail. This would be much to cumbersome for either the application writer or the customer without the structure of the notation specified in section 2.

The invention also allows for the application to give a correct display when a device exploits a new attribute (against an existing condition). The application will display the correct list of alarms even if it was built before the new attribute was added to the list and implemented in the device. The application will also display the correct text for new fields introduced after the application was built. This is achieved by the application displaying the text from the device. Previously this was not possible as it would have to map a number to the text. This mapping would not be available at the time the application was built.

Advantages for management applications include:
1. Ability for an application to display texts that were introduced after the application was built
2. Ability for an application to filter on conditions like fail without complex activity from the user or complex knowledge in the application.
3. Ability for application to perform 2 correctly, even for attributes that were introduced in devices after the application was built The invention has been described with reference to a preferred embodiment thereof. Alterations and modifications as would be obvious to those skilled in the art are intended to be incorporated within the scope hereof.

The invention claimed is:

1. A method of generating data for inclusion in a probable cause field of a telecommunications network alarm indication message, the method comprising:
  detecting the occurrence of an event in a telecommunications network affecting an entity of the network;
  mapping one or more characteristics of the event to first and second predetermined probable cause codes by selecting from a first list of probable cause codes defining conditions that affect entities of the network a first predetermined probable cause code identifying a condition affecting said entity of the network and selecting from a second list of probable cause codes defining attributes of entities of the network a second predetermined probable cause code identifying an attribute of said entity of the network; and generating the data for inclusion in a probable cause field of a telecommunications network alarm indication message, the generated data comprising first and second delimited data elements respectively indicating the first and second predetermined probable cause codes.

2. A method according to claim 1, comprising mapping the one or more characteristics of the event to a third predetermined probable cause code identifying a qualifier of the attribute, and wherein the generated data comprises a third delimited data element indicating the third predetermined probable cause code.

3. A method of generating a telecommunications network alarm indication message, the method comprising:

generating data for inclusion in a probable cause field of a telecommunications network alarm indication message according to the method of claim 1; and including the generated data in a telecommunications network alarm indication message.

4. Apparatus for generating data for inclusion in a probable cause field of a telecommunications network alarm indication message, the apparatus comprising:

a detector arranged to detect the occurrence of an event in a telecommunications network affecting an entity of the network;

a mapper arranged to map one or more characteristics of the event to first and second predetermined probable cause codes by selecting from a first list of probable cause codes defining conditions that affect entities of the network a first predetermined probable cause code identifying a condition affecting said entity of the network and selecting from a second list of probable cause codes defining attributes of entities of the network a second predetermined probable cause code identifying an attribute of said entity of the network; and a data processor arranged to generate the data for inclusion in a probable cause field of a telecommunications network alarm indication message, the generated data comprising first and second delimited data elements respectively indicating the first and second predetermined probable cause codes.

5. An apparatus according to claim 4, wherein the mapper is arranged to map the one or more characteristics of the event to a third predetermined probable cause code identifying a qualifier of the attribute, and wherein the generated data comprises a third delimited data element indicating the third predetermined probable cause code.

6. An apparatus for generating a telecommunications network alarm indication message, the apparatus comprising:

an apparatus for generating data for inclusion in a probable cause field of a telecommunications network alarm indication message according to claim 4; and a data processor arranged to include the generated data in a telecommunications network alarm indication message.

7. A computer readable medium storing a computer program for generating data for inclusion in a probable cause field of a telecommunications network alarm indication message, the computer program comprising:

program code arranged to detect the occurrence of an event in a telecommunications network affecting an entity of the network;

program code arranged to map one or more characteristics of the event to first and second predetermined probable cause codes by selecting from a first list of probable cause codes defining conditions that affect entities of the network a first predetermined probable cause code identifying a condition affecting said entity of the network and selecting from a second list of probable cause codes defining attributes of entities of the network a second predetermined probable cause code identifying an attribute of said entity of the network; and program code arranged to generate the data for inclusion in a probable cause field of a telecommunications network alarm indication message, the generated data comprising first and second delimited data elements respectively indicating the first and second predetermined probable cause codes.

8. A computer readable medium storing a computer program according to claim 7, comprising program code arranged to map the one or more characteristics of the event to a third predetermined probable cause code identifying a qualifier of the attribute, and wherein the generated data comprises a third delimited data element indicating the third predetermined probable cause code.

9. A computer readable medium storing computer program for generating a telecommunications network alarm indication message, the computer program comprising:

program code for generating data for inclusion in a probable cause field of a telecommunications network alarm indication message, according to claim 7; and program code arranged to include the generated data in a telecommunications network alarm indication message.

10. A method of processing a telecommunications network alarm indication message, the method comprising:

identifying first and second delimited data elements in a probable cause field of the alarm indication message;

using one of said first and second delimited data elements to identify a first predetermined probable cause code from a first list of probable cause codes defining conditions that affect entities of the network and using another one of said first and second delimited data elements to identity a second predetermined probable cause code from a second list of probable cause codes defining attributes of entities of the network; and processing the alarm indication message using the first predetermined probable cause code.

11. A method according to claim 10, wherein the second predetermined probable cause code identifies a qualifier of the attribute and wherein the step of processing the alarm indication message uses the second predetermined probable cause code.

12. A method according to claim 10, wherein the step of processing the alarm indication message comprises displaying the first predetermined probable cause code, or information derived therefrom, on a user display.

13. A method according to claim 10, wherein the step of processing the alarm indication message comprises selecting the alarm indication message in dependence on whether the first predetermined probable cause code matches a predetermined criterion.

14. Apparatus for processing a telecommunications network alarm indication message, the apparatus comprising:

a delimiter arranged to identify first and second delimited data elements in a probable cause field of the alarm indication message;

a comparator arranged to use one of said first and second delimited data elements to identify a first predetermined probable cause code from a first list of probable cause codes defining conditions that affect entities of the network and to use another one of said first and second delimited data elements to identify a second predetermined probable cause code from a second list of probable cause codes defining attributes of entities of the network; and a data processor arranged to process the alarm indication message using the first predetermined probable cause code.

15. Apparatus according to claim 14, wherein the second predetermined probable cause code identifies a qualifier of the attribute and wherein the data processor is arranged to process the alarm indication message using the second predetermined probable cause code.

16. Apparatus according to claim 14, comprising a user display, wherein the data processor is arranged to display the first predetermined probable cause code, or information derived therefrom, on the user display.

17. Apparatus according to claim 10, wherein the data processor is arranged to select the alarm indication message in dependence on whether the first predetermined probable cause code matches a predetermined criterion.

18. A computer readable medium storing a computer program for processing a telecommunications network alarm indication message, the computer program comprising:

program code arranged to identify first and second delimited data elements in a probable cause field of the alarm indication message;

program code arranged to use one of said first and second delimited data elements to identify a first predetermined probable cause code from a first list of probable cause codes defining conditions that affect entities of the network and to use another one of said first and second delimited data elements to identify a second predetermined probable cause code from a second list of probable cause codes defining attributes of entities of the network; and program code arranged to process the alarm indication message using the first predetermined probable cause code.

19. A computer readable medium storing a computer program according to claim 18, wherein the second predetermined probable cause code identifies a qualifier of the attribute and wherein the program code arranged to process the alarm indication message uses the second predetermined probable cause code.

20. A computer readable medium storing a computer program according to claim 18, wherein the program code arranged to process the alarm indication message is arranged to display the first predetermined probable cause code, or information derived therefrom, on a user display.

21. A computer readable medium storing a computer program according to claim 18, wherein the program code arranged to process the alarm indication message is arranged to select the alarm indication message in dependence on whether the first predetermined probable cause code matches a predetermined criterion.

* * * * *